United States Patent [19]
Martz

[11] Patent Number: 6,021,740
[45] Date of Patent: *Feb. 8, 2000

[54] WHEELED ANIMAL CARRIER

[75] Inventor: Gayle Martz, New York, N.Y.

[73] Assignee: Gayle Martz, Inc., New York, N.Y.

[*] Notice: This patent is subject to a terminal disclaimer.

[21] Appl. No.: 09/120,913

[22] Filed: Jul. 22, 1998

Related U.S. Application Data

[63] Continuation-in-part of application No. 08/924,979, Sep. 8, 1997, Pat. No. 5,941,195.

[51] Int. Cl.⁷ ..................................................... A01K 1/00
[52] U.S. Cl. .......................... 119/497; 119/500; 119/496; 119/482; 190/117; 190/112
[58] Field of Search ..................... 119/482, 496, 119/497, 500; 190/18 A, 115, 117, 112; D30/109

[56] References Cited

U.S. PATENT DOCUMENTS

| | | | |
|---|---|---|---|
| 4,852,520 | 8/1989 | Goetz | 119/497 |
| 4,977,857 | 12/1990 | Slawinski | 119/497 |
| 5,105,919 | 4/1992 | Bomes et al. | 190/18 A |
| 5,170,745 | 12/1992 | Burdette, Jr. | 119/497 |
| 5,671,698 | 9/1997 | Farrugia | 119/497 |
| 5,701,843 | 12/1997 | Lazides | 119/496 |

OTHER PUBLICATIONS

Webpage Advertisement by Samsonite Innovative Travel Products, illustrating the Samsonite Soft–Sided Pet Carrier, Jun. 21, 1999.

Primary Examiner—Peter M. Poon
Assistant Examiner—Judith A. Nelson
Attorney, Agent, or Firm—Abelman, Frayne & Schwab

[57] ABSTRACT

A portable animal carrier is disclosed which permits the transportation of a small animal, such as a cat or dog, in the passenger compartment of an airplane, by securely and safely containing the animal, but permitting placement below the airplane seat. In addition to providing manual carrying of the portable animal carrier, wheels are provided to permit smooth, quiet, and reliable movement, thereby relieving the user from carrying the weight of the animal carrier.

13 Claims, 4 Drawing Sheets

1

WHEELED ANIMAL CARRIER

RELATED APPLICATION

This is a continuation-in-part of Animal Carrier, Ser. No. 08/924,979, filed Sep. 8, 1997, now U.S. Pat. No. 5,941,195.

FIELD OF THE INVENTION

The present invention relates generally to a portable animal carrier which permits the safe and humane traveling of an animal, such as a cat and dog, on a common carrier. When used on an airplane, the animal carrier is of a size which can safely accommodate a cat or dog, and may be safely stowed below an airplane seat. The animal carrier includes recessed wheels along its bottom surface, to permit smooth, quiet, and reliable movement, thereby relieving the user from carrying the weight of the animal carrier.

BACKGROUND OF THE INVENTION

It is known to provide a portable animal carrier which is of a suitable size, and securely constructed, to obtain airline approval for passage within the main carrier cabin. Such a portable animal carrier contains an enclosure including appropriately connected bottom, top, end, front, and rear walls, with at least one of the walls including an area formed of mesh material for providing appropriate ventilation to the interior of the enclosure. At least one of the walls includes a selectively openable closure means, such as a zippered panel, which provides a sufficiently large opening for the convenient insertion and removal of the animal from within the interior volume of the enclosure. In order to facilitate manual carrying of the portable animal carrier, a carrier strap means is typically secured to appropriate locations, and extends above the top wall. Such strap means may include both a hand tote strap and a shoulder strap, so as to provide a versatility of totable options. In the aforementioned U.S. Pat. No. 5,941,195, a supplemental strap is provided which is suitably placed and configured to secure the portable animal carrier on top of a wheeled article of luggage. However in those situations where the individual is not utilizing a wheeled article of luggage, the need also exists to safely and reliably transport the animal within the portable animal carrier without the need to actually carry the portable animal carrier, which movement must be achieved in a manner that is comfortable, and safe to the animal, and does not create animal anxiety.

SUMMARY OF THE INVENTION

In accordance with the present invention, externally projecting wheels are provided along the bottom surface of the portable animal carrier, with an appropriate pull strap means being attachable to one of the end walls of the portable animal carrier, such that the user may grasp the strap, and pull the portable animal carrier along the floor surface. The pull strap is preferably detachable, such that when it is desired to use the portable animal carrier in the conventional manner, with the user grasping another strap on the portable animal carrier to either hold the portable animal carrier in his or her hand or over the shoulder, the pull strap can either be removed, or placed within a compartment of the portable animal carrier.

Recognizing the need to avoid anxiety of the animal within the portable animal carrier while it is being wheeled, which could tend to frighten same, resulting in nausea or wetting, the wheels are selected and the portable animal carrier constructed to minimize vibration and noise. Sound and vibration cushioning material is preferably provided between the wheels and the interior of the portable animal carrier. Such sound cushioning material may be in the form of a soft absorbent pad, which is advantageously placed within a removable tray like member. Further, the tray may also be formed of cushioning material to provide an additional layer to muffle the sound and vibration of the wheels. According to a particularly advantageous feature of the present invention, the cushioning material and tray may be removed as a unit to provide a separate bed, when it is not necessary to keep the animal within the enclosed portable animal carrier. By providing the cushioning material as a removable pad, it may readily be replaced should it become soiled, thereby maintaining a hygienically clean condition.

As a further feature of the present invention, end frame members are provided to maintain rigidity of the portable animal carrier. However, during shipment of the empty portable animal carrier, particularly from its manufacturing source, it is highly advantageous that the portable animal carrier be reconfigured to a more compact size. To facilitate the compact reconfiguration of the portable animal carrier, one of the end frame members is flexible. The rigid frame member may typically be formed of steel, with the flexible frame member formed of bamboo or resilient plastic.

Accordingly, a primary object of the present invention is to provide a portable animal carrier, having particular utilization within an airplane passenger compartment, which may be safely and readily wheeled along a floor surface.

A further object of the present invention is to provide such a portable animal carrier which includes wheels along its bottom surface and a detachable pull strap which may be grasped by the user when it is desired to wheel the portable animal carrier along the floor surface.

Another object of the present invention is to provide such a portable animal carrier which includes sound cushioning material for muffling the wheel noise.

Yet another object of the present invention is to provide such a portable animal carrier in which the sound cushioning material is provided within a removable tray like member which can be separated from the portable animal carrier and utilized as a pet bed.

An additional object of the present invention is to provide such a portable animal carrier which includes a rigid frame member to maintain its shape while there is an animal therein, but when the animal is removed, can be oriented into a generally flattened storage, or shipping, configuration.

The above as well as other objects and advantages of the present invention will become apparent upon consideration of the following drawings and description with respect to a preferred embodiment of the present invention.

BRIEF DESCRIPTION OF THE DRAWINGS

FIG. 8 shows the animal carrier in its generally flattened storage, or shipping, condition.

DETAILED DESCRIPTION

Figure 1:
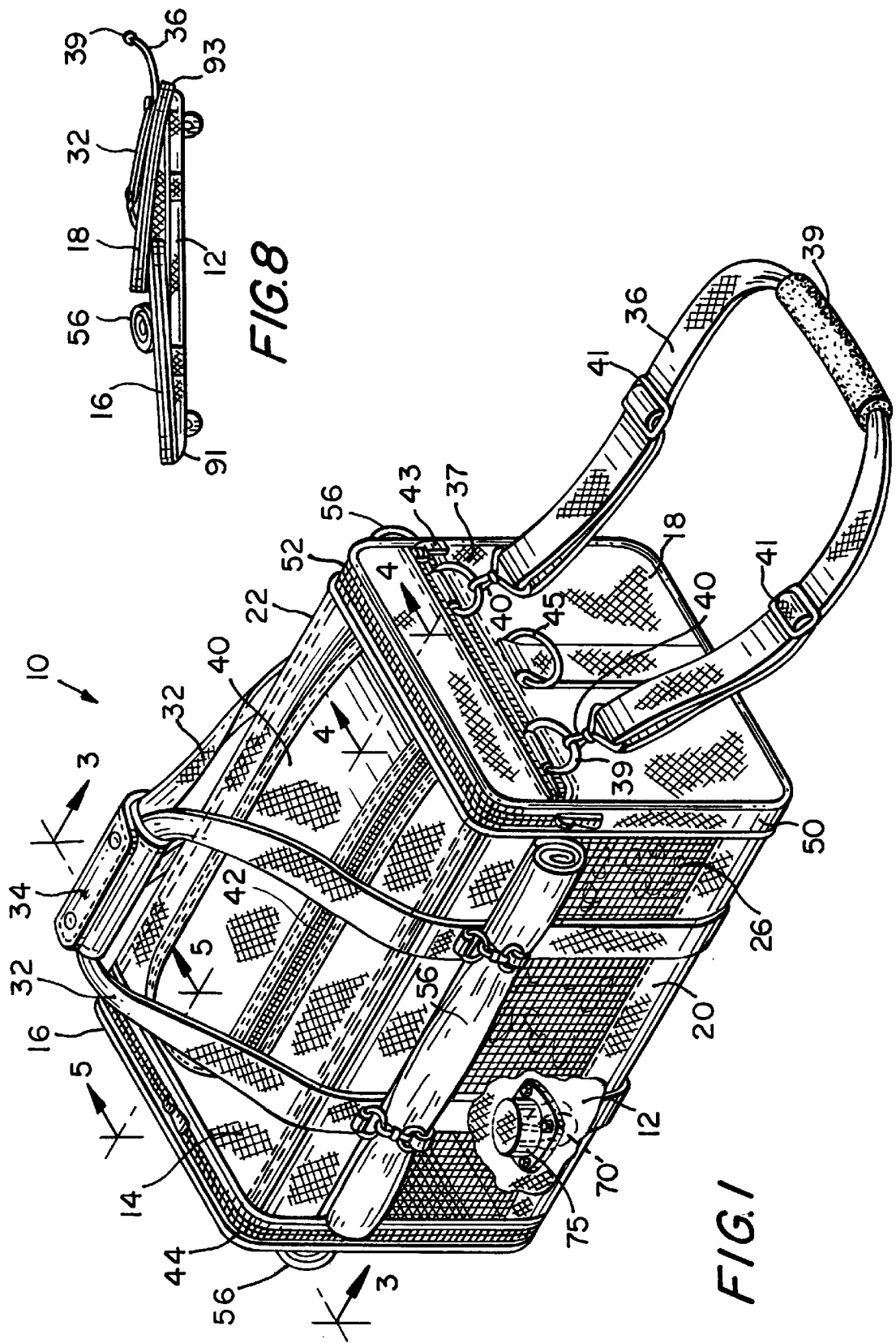
FIG. 1 is a perspective view of the portable animal carrier.

Reference is initially made to FIGS. 1–7. The portable animal carrier 10 includes bottom wall 12, top wall 14, opposed end walls 16, 18, front wall 20, and rear wall 22. These walls combinedly define a generally rectilinear interior volume, which is of a suitable size for the reception of a cat or small dog, and can be comfortably retained below an airline seat. Typically, the portable animal carrier may be between 18 to 20 inches long, 10½ to 11½ inches high, and 11 to 11¾ inches wide. It should be constructed of appropriate rugged materials utilized for luggage, such as quilted nylon, vinyl, other reinforced textile fabrics, or leather.

At least one, and preferably more than one, of the walls includes an area formed of mesh material for providing ventilation to the interior of the enclosure. Such mesh material inserts are shown as 26 along the front wall 20, and 28 along end wall 16. A mesh material insert, not shown, may also be provided along rear wall 22. To facilitate manual carrying of the portable animal carrier, two carrier strap means are preferably provided. These include straps 32, which are connected to the opposed front and rear walls (20, 22), extend over the top wall 14, and are connected together by a manual grasping member 34. A multi-function strap 36 is also provided. As shown in FIG. 1, strap 36 is connected to ring members 37, 39. Strap 36 includes a padded hand grip 39, which may preferably be formed of foam rubber. The length of strap 36 may be adjusted by buckles 41 in the well known manner. Advantageously, end wall 18 includes an end compartment which is accessible by closure zipper 43, which allows the storage therein of strap 36 when it is not in use. Ring members 37, 39 may also be connected inside the storage compartment, such that when strap 36 is inserted therein, and the zipper 43 moved to its closed condition, the complete assembly of strap 36 and its associated ring members 37, 39 will be within the compartment.

Strap 36 may also function as a shoulder strap when it is desired to utilize the portable animal carrier 10 in that mode of operation. In that event, strap 36 is removed from ring members 37, 39. One end of strap 36 is secured to ring member 45 along end wall 18. The opposite end wall 16 includes a similar ring member (not shown) for securing the other end of strap 36. Strap member 36 includes spring located connectors 40 at its opposed ends to readily permit the dual mode of operation. That is, when connected to ring members 37, 39 it will serve as a pull in conjunction with the wheels 70 provided along the bottom wall 12 of the portable animal carrier. Alternatively, the spring loaded connectors 40 may engage ring member 45 on end wall 18, and the complementary ring member (not shown) at the opposed wall 16, to serve as a shoulder strap. Alternatively, strap 36 can be completely removed from the portable animal carrier 10 and serve as a leash, with spring loaded connector 40 at one at its ends engaging the typical loop connector (not shown) of a conventional animal collar.

At least one of the wall includes a openable closure means, to provided sufficiently large opening for the insertion and removal of an animal from within the interior volume of enclosure 10. Advantageously, two such panels are shown as top panel 40 having a U-shaped perimeter zipper 42, and a panel 54 in end 16 which can be completely opened by its perimeter zipper 44. Thus, the animal may be inserted or removed from the enclosure through either the top or an end section. Further, while the animal is in the enclosure, the top panel 40 may be opened to permit the animal to lift its head out of the enclosure, while the rest of its body is still within the enclosure.

An exterior compartment is preferably provided to include travel essentials, such as veterinary papers, snacks or small toys for the animals. One such exterior compartment is shown as compartment 50 along the end wall 18 which may be accessed by zipper 52.

Figure 6:
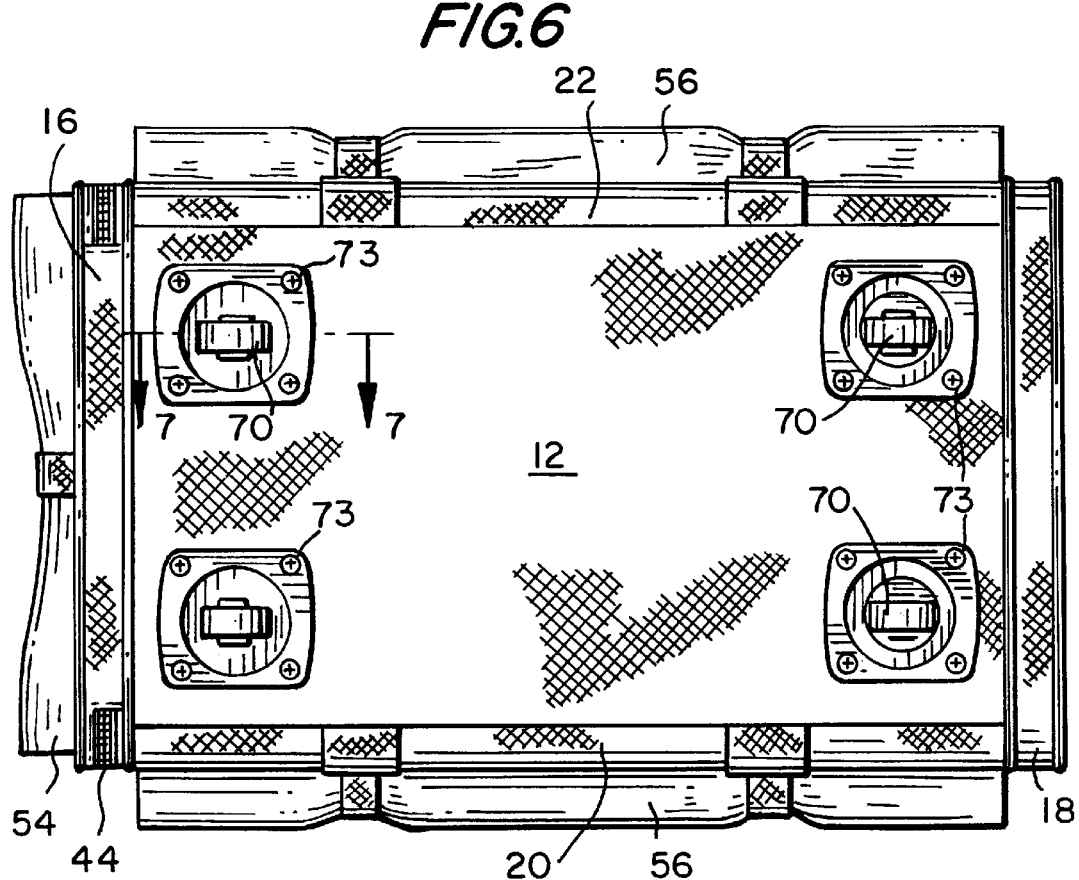
FIG. 6 is a bottom view.
Figure 7:
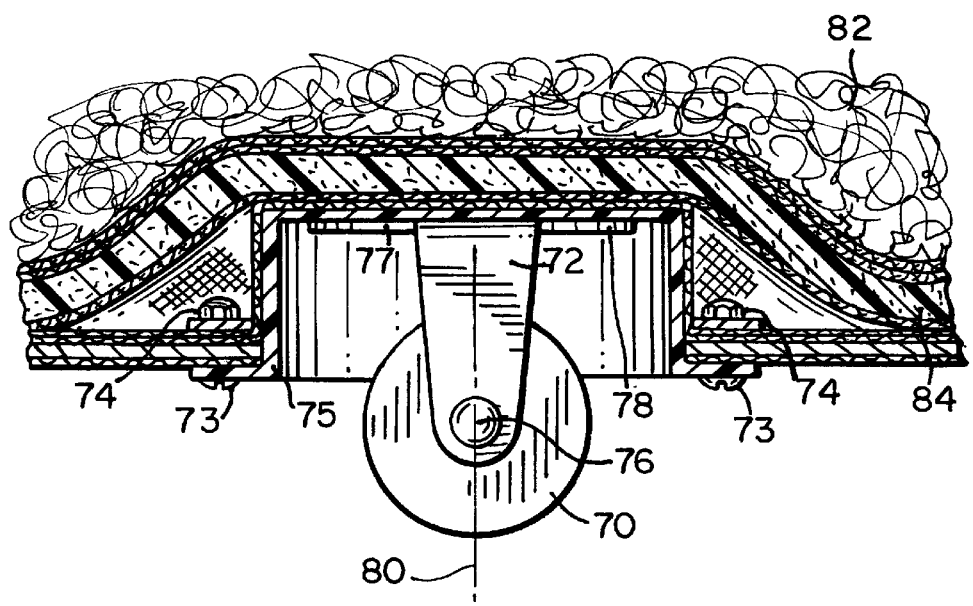
FIG. 7 is a cross sectional view along lines 7—7 as shown in FIG. 6 and looking in the direction of the arrows.

In accordance with the present invention, a plurality of wheels 70, as best shown in FIGS. 6 and 7, are located at the corners of the bottom panel 12. Each of the wheels 70 is mounted to a yoke 72 via axle 76. Yoke 72 includes a base portion 77 which is rotationally mounted to generally horizontal extension 78 of the wheel assembly housing 75 with ball bearings (not shown). Thus, each wheel and yoke subassembly (70–72) is free to independently rotate about its vertical axis 80 when it is desired to change the direction of movement of the portable animal carrier 10. The wheel assembly housing 75 is mounted within a recess of the bottom panel by bolt and fastener members 73, 74 which mount the wheel housing assembly 75 to the bottom panel 12. The recessed wheel assembly 75 will have its wheel 70 ejecting outward from the bottom panel 12, so as to contact the floor surface when it is desired to move the portable animal carrier 10 by manually grasping grip portion 39 of strap 36. Wheels 70 are preferably formed of rubber which, in conjunction with the mounting of yoke 72, provides an easy-glide smooth and quiet movement. This is most advantageous since excessive wheel noise or vibration would tend to frighten the animal within the pet carrier, which, could result in nausea or incontinence.

Figure 2:
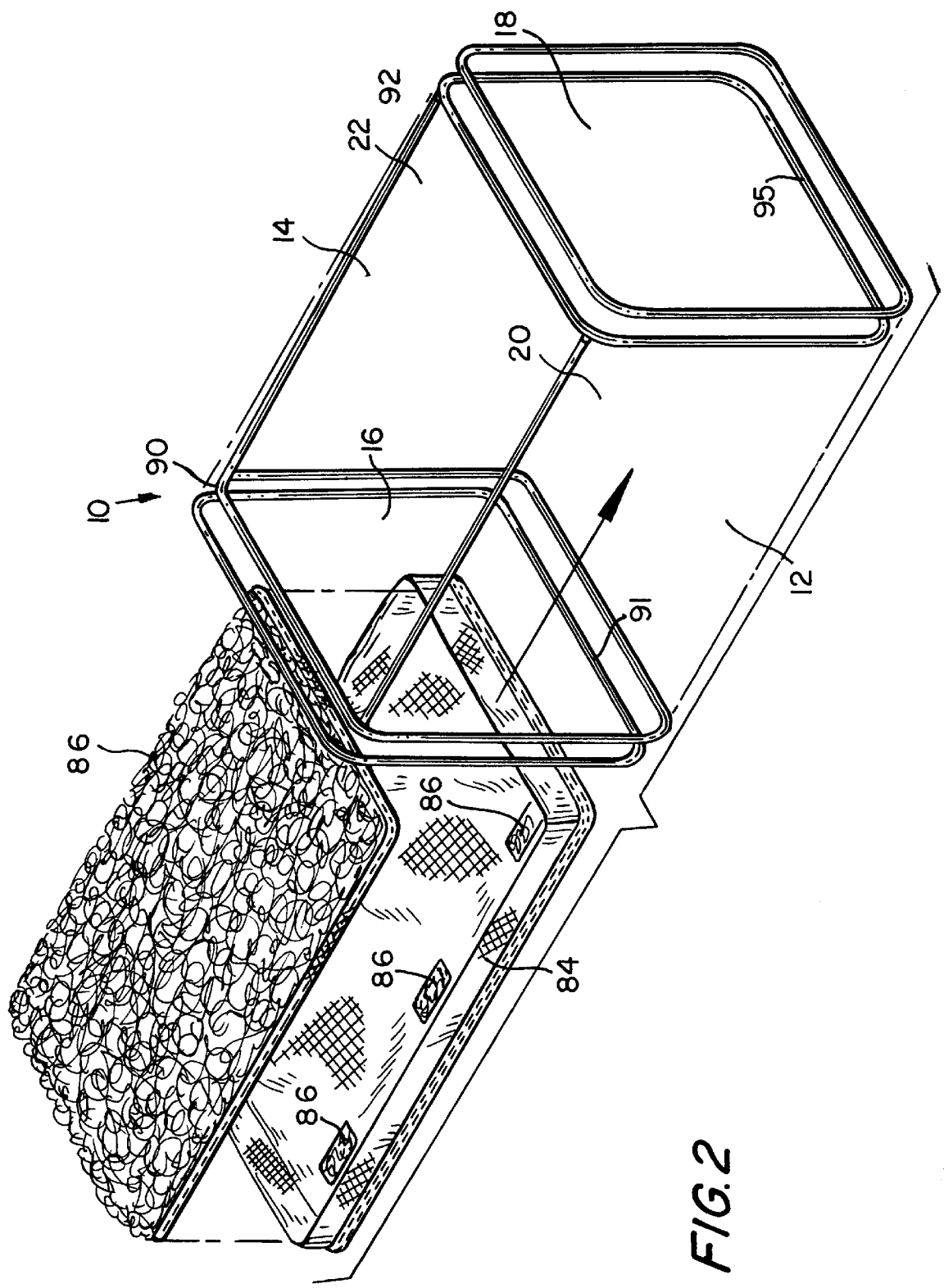
FIG. 2 is an exploded perspective view, with the main body of the portable animal carrier shown diagrammatically, and the tray and cushioning material being shown removed therefrom.
Figure 3:
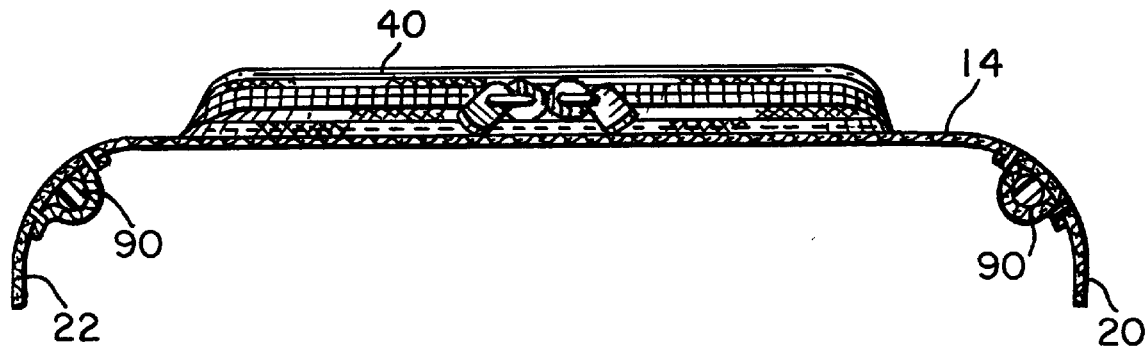
FIG. 3 is a cross sectional view along lines 3—3 as shown in FIG. 1 and looking in the direction of the arrows.
Figure 4:
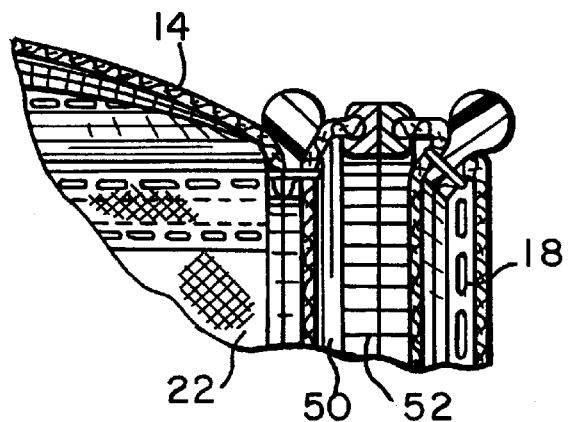
FIG. 4 is a cross sectional view along lines 4—4 as shown in FIG. 1 and looking in the direction of the arrows.
Figure 5:
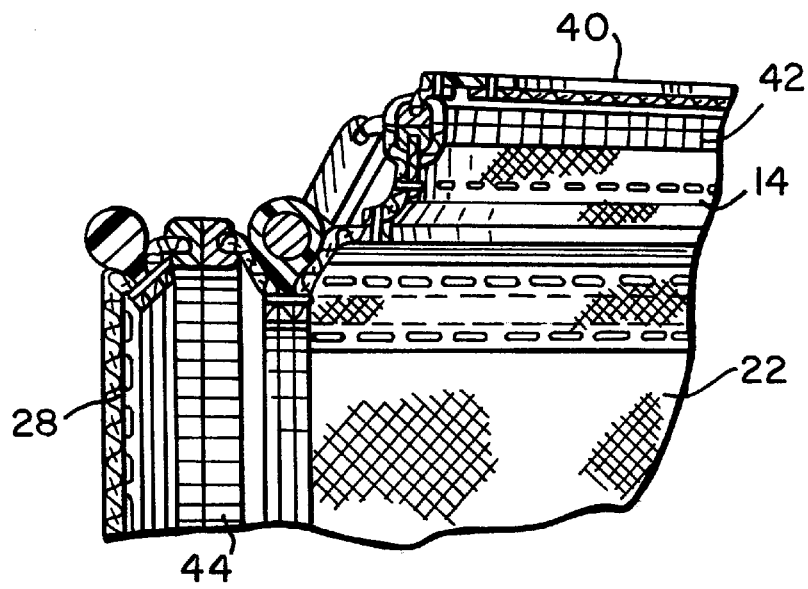
FIG. 5 is a cross sectional view along lines 5—5 as shown in FIG. 1 and looking in the direction of the arrows.

As a further advantageous feature of the present invention, a cushioned sound absorbing liner 82 overlies the bottom wall 12. Liner 64 is preferably soft, washable, and removable and may typically be formed of faux lambskin for increased animal comfort. Liner 82 is preferably provided within a removable tray 84, which is formed of a fabric having internal padding, to provide increased muffling of the wheel sound and vibration. The liner 82 is removably attached to the tray 84 by a plurality of separable hook and eye Velcro elements 86. Although the Velcro elements 86 of the tray are shown in FIG. 2, complementary elements (not shown) are placed along the bottom of the liner 82. Advantageously the tray 84 and liner may be removed as a subassembly as best shown in FIG. 2, so that it may then function as an animal bed when the animal is taken out of the portable animal carrier 10.

To provide for appropriate reinforcement, and shape maintenance, while the portable animal carrier is in use, a rectangular rigidizing frame 90, which may be typically formed of steel, is provided about the perimeter of end 16. A flexible, but shape retaining, frame 92 is provided about the opposite end 18. Frames 90 and 92 are pivoted with respect to their bottom walls, about their respective corner junctions 91, 93 so that the portable animal carrier can be reoriented to a compact storage, or shipping, condition as shown in FIG. 8. Flexibility of end panel 18 when it is in its storage position is provided by its frame 92. Frame 92 may typically be formed of bamboo or plastic. This allows end panel 18 to be somewhat curved while in the storage condition of FIG. 8, thereby minimizing the volume of the compacted unit.

While the invention has been described with reference to a preferred embodiment, this embodiment is merely exemplary and is not intended to be limiting or to represent all aspects of the invention. Accordingly, the scope of the invention shall be defined solely by the following claims.

What is claimed:

1. A wheeled portable animal carrier comprising:

an enclosure including a bottom base, a top wall, first and second end walls, and rear and front walls, to define an interior volume;

said bottom base including opposed interior and exterior surfaces, and wheels externally projecting from said exterior surface for moving the animal carrier along a surface;

at least one of said walls including an area formed of mesh material for providing ventilation to the interior of the enclosure;

at least one of said walls including a selectively openable closure means for providing a sufficiently large and manually sealable opening for the insertion and removal of an animal from within said interior volume;

a carrier strap connectable to said enclosure and extending above said top wall a sufficient extent for manual carrying of the portable animal carrier above the surface;

a pull strap connectable to said front wall for manual pulling of the animal carrier along the surface, whereby the animal carrier can be selectively moved between a first operating condition in which it is manually carried above the surface by said carrier strap; and a second operative condition in which it is manually pulled along the surface by said pull strap;

said enclosure and wheels being formed of sound cushioning materials to minimize the transmission of vibration and noise from said wheels to said interior volume when said animal carrier is in said second operative condition.

2. A wheeled portable animal carrier according to claim 1, further including a removable member for insertion within said interior volume against the interior surface of said bottom base, said removable member including sound cushioning material for muffling wheel noise during said second operative condition.

3. A wheeled portable animal carrier according to claim 2, wherein, said removable member is a tray, and said cushioning material includes a removable absorbent pad within said tray, with said tray and absorbent pad being removable from said portable animal carrier as a sub-assembly to provide a separate pet bed.

4. A wheeled portable animal carrier according to claim 3, wherein said absorbent pad is formed of soft fluffy material.

5. A wheeled portable animal carrier according to claim 4, wherein the material of said absorbent pad is faux lambskin.

6. A wheeled portable animal carrier according to claim 2, wherein said removable member is a tray formed of sound and vibration cushioning material for muffling wheel noise and vibration during said second operative condition.

7. A wheeled portable animal carrier according to claim 6, further including a soft absorbent pad within said tray.

8. A wheeled portable animal carrier according to claim 1, wherein:

said interior volume is generally rectangular, a first frame member about the periphery of one of said end walls, and a second frame member about the periphery of the other end wall, one of said frame members being rigid, and the other of said frame members being flexible, whereby said animal carrier can be oriented into a generally flattened storage condition, or an erect operative condition, with said one frame member preventing collapse of said interior volume.

9. A wheeled portable animal carrier according to claim 8, wherein said one frame member is formed of steel.

10. A wheeled portable animal carrier according to claim 8, wherein said other frame member is formed of bamboo.

11. A wheeled portable animal carrier according to claim 8, wherein said other frame member is formed of a resilient plastic.

12. A wheeled portable animal carrier according to claim 9, wherein said other frame member is formed of a resilient material.

13. A wheeled portable animal carrier according to claim 1 wherein said sound cushioning materials include forming said wheels of rubber and said enclosure of a flexible material.

* * * * *

UNITED STATES PATENT AND TRADEMARK OFFICE
CERTIFICATE OF CORRECTION

PATENT NO. : 6,021,740
DATED : February 8, 2000
INVENTOR(S) : Gayle Martz

It is certified that error appears in the above-identified patent and that said Letters Patent is hereby corrected as shown below:

Col. 3, line 22: Between "22." and "To", insert
--On each wall of the carrier that includes an area of mesh material, a flap 56 is attached along an upper part of the corresponding wall. The flaps 56 can be individually positioned in a rolled-up state or a mesh-covering state. Releasable fastening means for maintaining the flaps in the rolled-up state are provided, as is shown in Figs. 1 and 6.--

Col. 3, line 29: Change "39" to --38--;
    line 35: Change "39" to --38--;
    line 39: Change "39" to --38--;
    line 44: Change "39" to --38--;
    line 50: Change "39" to --38--.

Col. 4, line 36: Change "64" to --82--.

Claim 1, line 20 [Col. 5, line 24]: Change "front" to --second end--; and
    line 23 [Col. 5, line 27]: Change "operating" to --operative--.

IN THE DRAWINGS

Fig. 1: Change "39" (occurrence within object, pointing to ring member) to --38--.

Fig. 2: Change "86" (occurrence above object, to left of center of page, pointing to liner) to --82--;
    Change "95" (lower right hand corner of drawing, inside object, pointing to corner junction of frame) to --93--;
    Draw connecting line vertically downward from "92" to object (pointing to frame).

Fig. 6: Change "54" (lower left-hand side of drawing, pointing to rolled-up flap) to --56--.

Signed and Sealed this

Sixth Day of February, 2001

Attest:

Q. TODD DICKINSON

Attesting Officer     Director of Patents and Trademarks